United States Patent [19]
Ostlie

[11] Patent Number: 6,161,601
[45] Date of Patent: Dec. 19, 2000

[54] HIGH PRODUCTIVITY WHOLE TREE HARVESTING METHOD AND SYSTEM

[76] Inventor: L. David Ostlie, 4900 N. Hwy. 169 Suite 306, Minneapolis, Minn. 55428

[21] Appl. No.: 09/327,248

[22] Filed: Jun. 7, 1999

Related U.S. Application Data

[60] Provisional application No. 60/088,470, Jun. 8, 1998.

[51] Int. Cl.[7] .................................................. A01G 23/08
[52] U.S. Cl. .......................... 144/4.1; 144/34.1; 144/336
[58] Field of Search ................................. 144/4.1, 24.13, 144/34.1, 335, 336, 338, 343

[56] References Cited

U.S. PATENT DOCUMENTS

| 4,273,168 | 6/1981 | Propst | 144/4.1 |
| 4,313,479 | 2/1982 | Coughran, Jr. | 144/4.1 |
| 4,445,552 | 5/1984 | Hyde et al. | 144/4.1 |

Primary Examiner—W. Donald Bray
Attorney, Agent, or Firm—Banner & Witcoff, Ltd.

[57] ABSTRACT

A tree harvester for continuously cutting and accumulating trees and a method for using such a harvester is disclosed. The harvester has a frame with a cutting area and a large elongate accumulation area. A tree severing device is secured to one end of the frame and a continuous rail having accumulating arms secured to it extends from the cutting area to the rear portion of the accumulation area. The arms are equally spaced apart from each other along the rail, with each arm traveling in a continuous circuit along the rail such that it moves from the cutting area to the accumulation area. During use, the harvester is aligned with a row of trees to be cut. As the first tree is cut by the severing device, an accumulating arm is positioned behind the tree and moves it to the rear most available portion of the accumulation area. As the harvester travels down the row of trees, each tree in the row is cut and moved to the rear most available portion of the accumulation area. In a preferred embodiment, the harvester is self-propelled, has a curfless cutter, and travels forward along the row of trees to be cut at the same speed as the arms travel around the circuit.

14 Claims, 19 Drawing Sheets

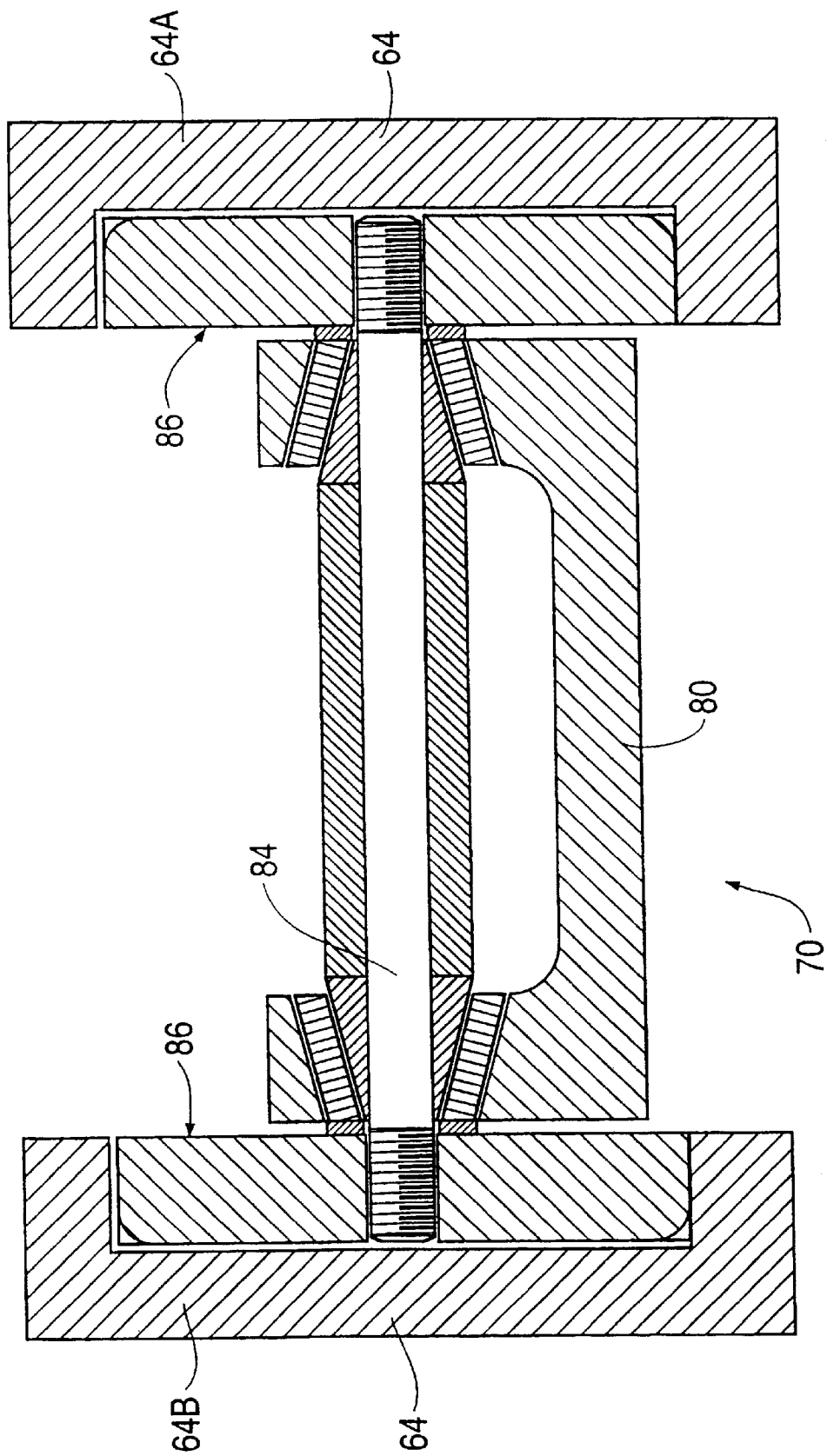

HIGH PRODUCTIVITY WHOLE TREE HARVESTING METHOD AND SYSTEM

This application claims the benefit of U.S. Provisional Application No. 60/088,470 filed on Jun. 8, 1998.

The present invention relates to a high-speed tree cutting and harvesting device and process. The invention concerns, more particularly, a continuous tree harvesting apparatus and method for quickly and efficiently cutting a large quantity of trees and accumulating those severed trees.

BACKGROUND OF THE INVENTION

The need for an economically viable continuous harvesting process has become apparent since the late 1980's. It is desirable to quickly and efficiently harvest trees using the least amount of resources. Such efficiency is particularly desirable on tree farms, where trees are planted in rows and harvested relatively quickly after planting, thereby yielding a high tonnage of wood per acre per year, but lesser amounts of usable wood per tree.

Some inventors have attempted to improve the efficiency of harvesting and accumulating harvested trees. For example, U.S. Pat. No. 5,697,412 to Kurelek discloses a feller head for mounting to a boom of a boomed-vehicle. The head includes a cutter and a relatively small accumulation area adjacent to the cutter for accumulating a small amount of cut trees.

However, such feller heads are not particularly useful for harvesting large volumes of trees, such as found of a tree farm. In particular, these types of cutting/accumulation devices do not offer continuous cutting and accumulation. An operator must first position the head next to a tree to be cut, command the cutting assembly to cut the tree, then command the bunching assembly to move the tree to the head's small accumulation area before another tree may be cut. This process must be repeated for each tree to be cut. Moreover, because of weight limitations of such designs and the relatively small size of their accumulation areas, the collection of cut trees must be frequently removed from the accumulation area, further increasing the time required to harvest a group of trees.

Thus, despite the improvements of the known tree harvesting and collecting devices and methods, there remains a need for a continuous harvesting device and process that will simultaneously, quickly, and if desired, automatically, harvest and accumulate a very large amount of trees in a limited amount of time. Also, there remains a need for a tree harvesting device having an accumulation area that may be emptied without the need to stop the harvesting process. In addition, there remains a need for a tree harvesting device that will sever trees without generating a large amount of sawdust and without relying on complex machinery to spin saw blades or drive hydraulic shears.

SUMMARY OF THE INVENTION

Fulfilling the forgoing needs is the primary objective of the invention.

The invention is a tree harvester for continuously cutting and accumulating trees and a method for using such a harvester. The harvester has a frame with a cutting area and a large elongate accumulation area. A tree severing device is secured to one end of the frame and a continuous rail having accumulating arms secured to it extends from the cutting area to the rear portion of the accumulation area. The arms are equally spaced apart from each other along the rail, with each arm traveling in a continuous circuit along the rail such that it moves from the cutting area to the accumulation area.

The tree harvester is aligned with a row of trees to be cut. As the first tree is cut by the severing device, an accumulating arm is positioned behind the tree and moves it to the rear most available portion of the accumulation area. As the harvester travels down the row of trees, each tree in the row is cut and moved to the rear most portion of the accumulation area. As each cut tree reaches the rear most available portion of the accumulation area, the arm propelling and supporting that tree retracts so that it may continue along its circuit with the next available arm supporting the accumulated trees.

In a preferred embodiment, the harvester is self-propelled, has a curfless cutter, and travels forward along the row of trees to be cut at the same speed as the arms travel around the circuit.

The accumulation area may be unloaded three different ways. First, a storage facility, such as a truck trailer may follow, or be towed by, the harvester such that as each cut tree reaches the rear most portion of the accumulation area, the arm propelling that tree is prevented from retracting thereby propelling the tree out the back of the harvester and into the storage facility. Second, the accumulation area may be filled, after which the arms may be activated to propel the entire batch of accumulated trees out of the rear of the harvester; or third, an integral hydraulic lift may lift the accumulated trees from the accumulation area. All three methods may be performed without interfering with the continuous cutting or accumulation of additional trees.

This invention represents a revolutionary high-speed cutting and harvesting process for trees. The machines have widespread applications, including harvesting of plantation grown rows of trees at greatly improved speeds and productivity levels. The basic technology is designed to be produced as machines of various sizes and types. These will be capable of harvesting trees up to 30 inches in diameter and 130 feet in height or trees as small as a few inches in diameter, depending on the model of machine.

BRIEF DESCRIPTION OF THE DRAWINGS

FIG. 11 is an enlarged cross-sectional view taken along lines 11—11 of FIG. 7.

DETAILED DESCRIPTION OF PREFERRED EMBODIMENTS

Figure 1:
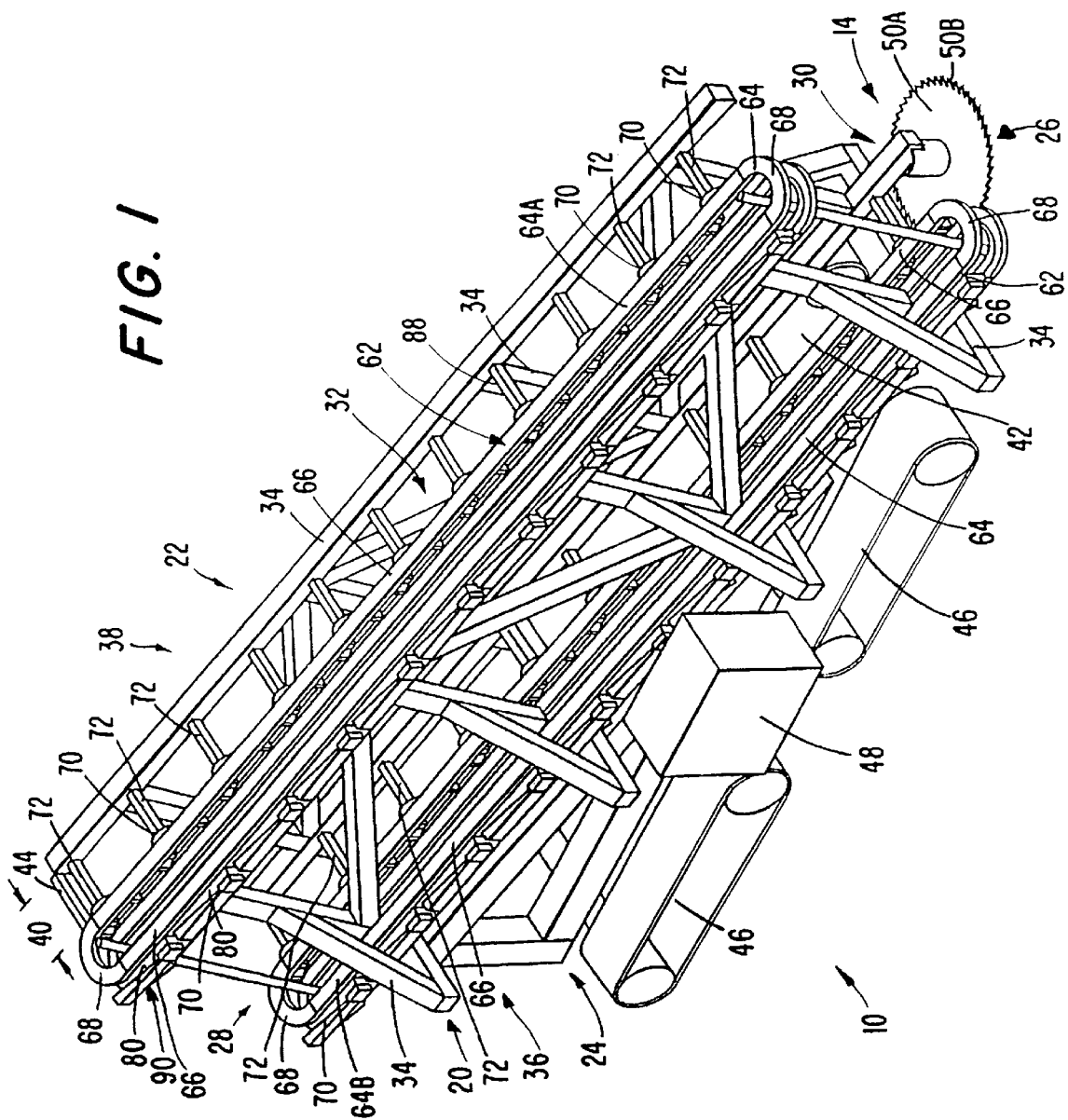
FIG. 1 is an isometric view of a tree harvester of the present invention having a rotating saw in accordance with a first preferred embodiment of the present invention.

A harvester 10 for continuous cutting and accumulation of a row of trees 12 according to several embodiments of the invention is shown in FIGS. 1–19E. A first preferred embodiment, shown in FIGS. 1–12D, discloses a self-propelled harvester 10 having a traditional rotating saw blade cutting apparatus 14 attached. A second preferred embodiment, shown in FIGS. 13–14, discloses a harvester 10' with a curfless cutting apparatus 140 installed. A third preferred embodiment, shown in FIGS. 15A–19E, discloses a harvester 10" that is propelled by an attached vehicle 16, such as a tractor. Each of these embodiments is discussed in greater detail below with like elements between the embodiments having like reference numbers. Actual systems will vary according to models and sizes produced.

FIRST PREFERRED EMBODIMENT

Figure 2:
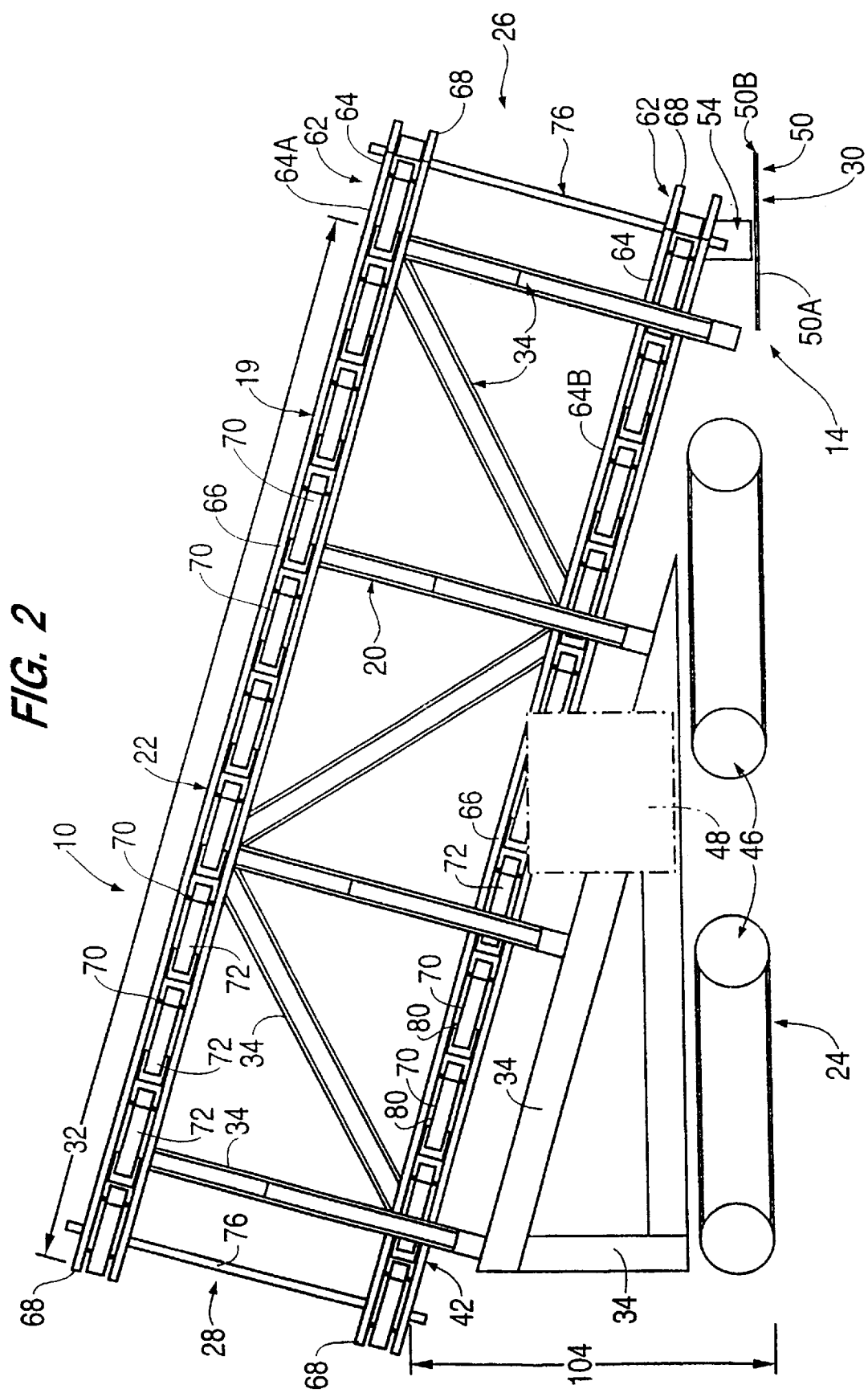
FIG. 2 is a side view of the harvester of FIG. 1.

As best shown in FIGS. 1 and 2, a harvester 10 in accordance with a first preferred embodiment includes a frame 20 having a top portion 22, a bottom portion 24, a front end 26, and a back end 28. The frame 20 has a cutting area 30 at the front end 26, preferably at the bottom portion 24 of the frame 20, and an accumulation area 32 extending from the cutting area 30 to the back end 28. The frame 20, preferably constructed of individual support members 34 of square steel tubing, has a generally elongate rectangular shape having the bottom portion 34 and left and right side portions 36, 38, respectively, extending perpendicularly from the bottom portion 34 defining an accumulation area width 40 therebetween. The width 40 is large enough to allow the trunk of a severed large diameter tree standing vertically to pass through the frame from the front end 26 to the back end 28 while the remainder of the tree extends above the top portion 22 of the frame 20. A skid plate 42 or sliding surface is secured at the bottom portion 24 of the frame 20. A back support member 44 is pivotally secured to the back end 28 of the frame 20 and extends between the left and right side portions 36, 38, respectively.

The frame 20 is self-propelled with known means and methods. One such method includes securing main track drives 46 to the frame 20 as shown in FIG. 1. The drives 46 are powered by known means such as one or more internal combustion or diesel engines 48 with appropriate drive shafts, axles, and power transfer gear arrangements (not shown). The frame 20 is steered with known means and methods such as by hydraulically manipulating the track members.

Cutting Apparatus

As best shown in FIGS. 1, 5, 6A and 6B, depending on the model of the harvester, the cutting apparatus 14 includes a single or double horizontal circular saw 50 (here one saw 50 is shown) positioned parallel to the ground. Powered saws 50 use either direct gear drive or hydraulic drive. One preferable cutting apparatus includes a single circular saw disk 50A of 77-inch cutting diameter, including teeth 50B. The saw disk 50 is driven by conventional means and methods. For example, it can be driven directly from a horizontal drive shaft leading from the engine and transmission to a right angle gearbox 54 mounted to the harvester frame 20. The gearbox 54 houses a hypoid angle gear set 56 driving a spindle shaft 58 that is fastened to the saw 50. The spindle shaft 58 is held in place by two tapered roller bearings 60 in the gearbox 54.

Accumulation Mechanism

An accumulator mechanism 62 transfers cut trees 63, which are standing in an upright position, from the cutting area 30 to the rear most available portion of the accumulation area 32. The accumulator mechanism 62 includes at least one continuous, closed loop, rail 64 or circuit extending from the front end 26 of the frame 20 to the back end 28 of the frame 20, adjacent to the accumulation area 32. Preferably, two rails 64A, 64B including an upper rail 64A and lower rail 64B as shown in FIGS. I and 2, or four rails 64A, 64A', 64B, 64B' including two opposing upper rails 64A, 64A' and two opposing lower rails 64B, 64B' as shown in FIGS. 3, 4, 8, 10, 12A–D, and 17 are used. Each rail 64A, 64A', 64B, 64B' preferably has four straight rail sections 66 with two radius sections 68 at the front end 26 and two at the back end 28. The rail sections 66 and radius sections 68 are preferably constructed of steel. In one preferred embodiment, the rails 64A, 64A', 64B, 64B' are C-section channels 2 inch×6 inch×1 inch thick.

Figure 3:
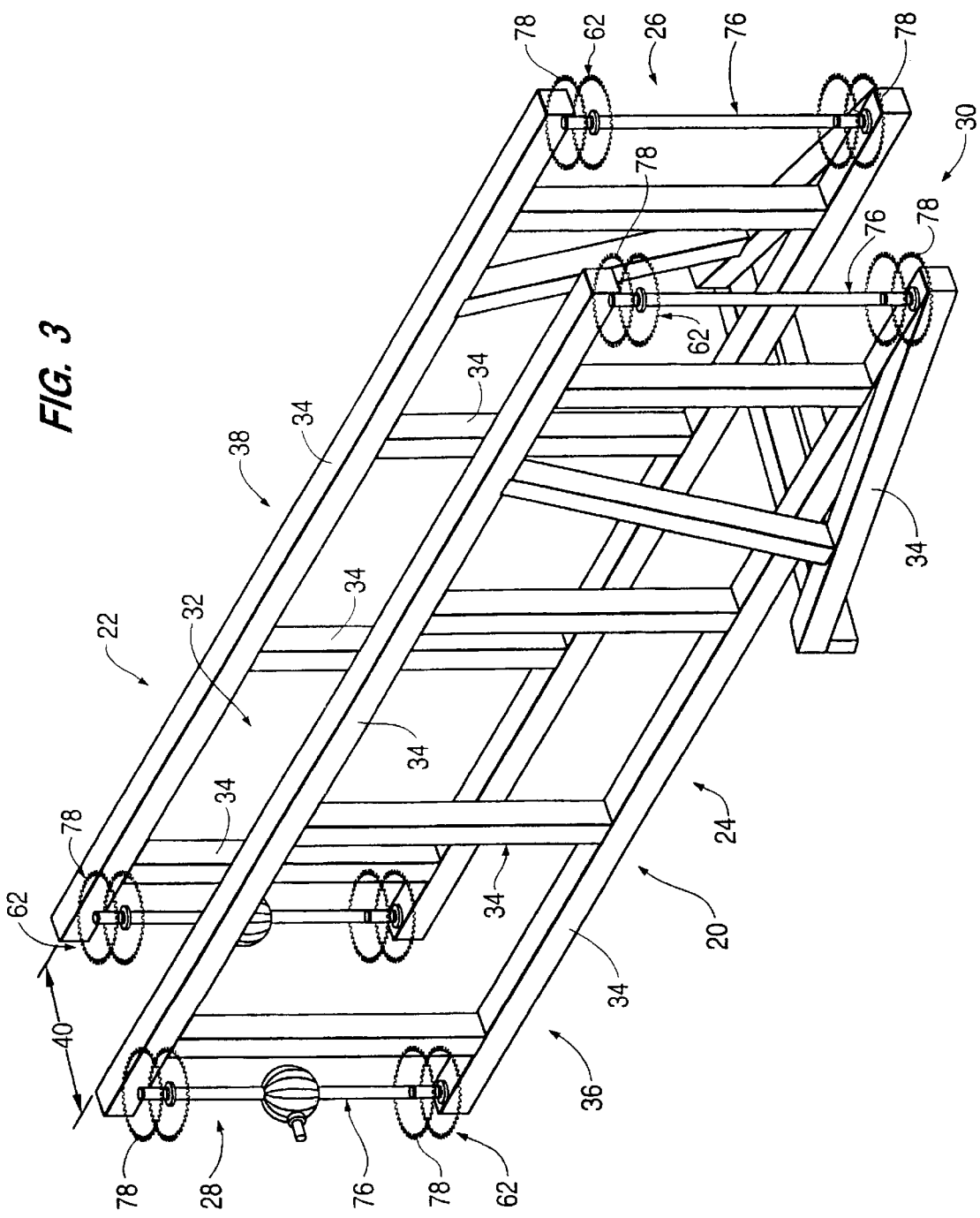
FIG. 3 is an isometric view of the frame and car drive sprockets of the harvester of FIG. 1.
Figure 4:
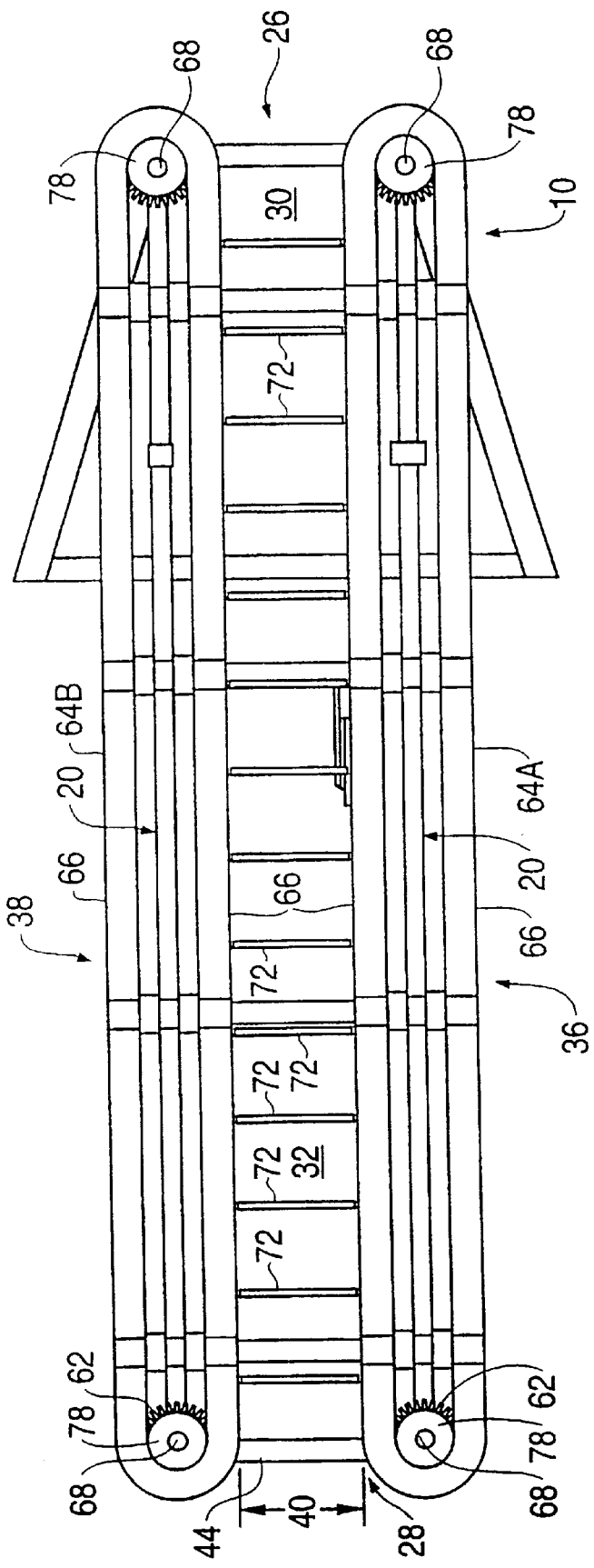
FIG. 4 is a top view of the frame and car drive sprockets of FIG. 3.
Figure 5:
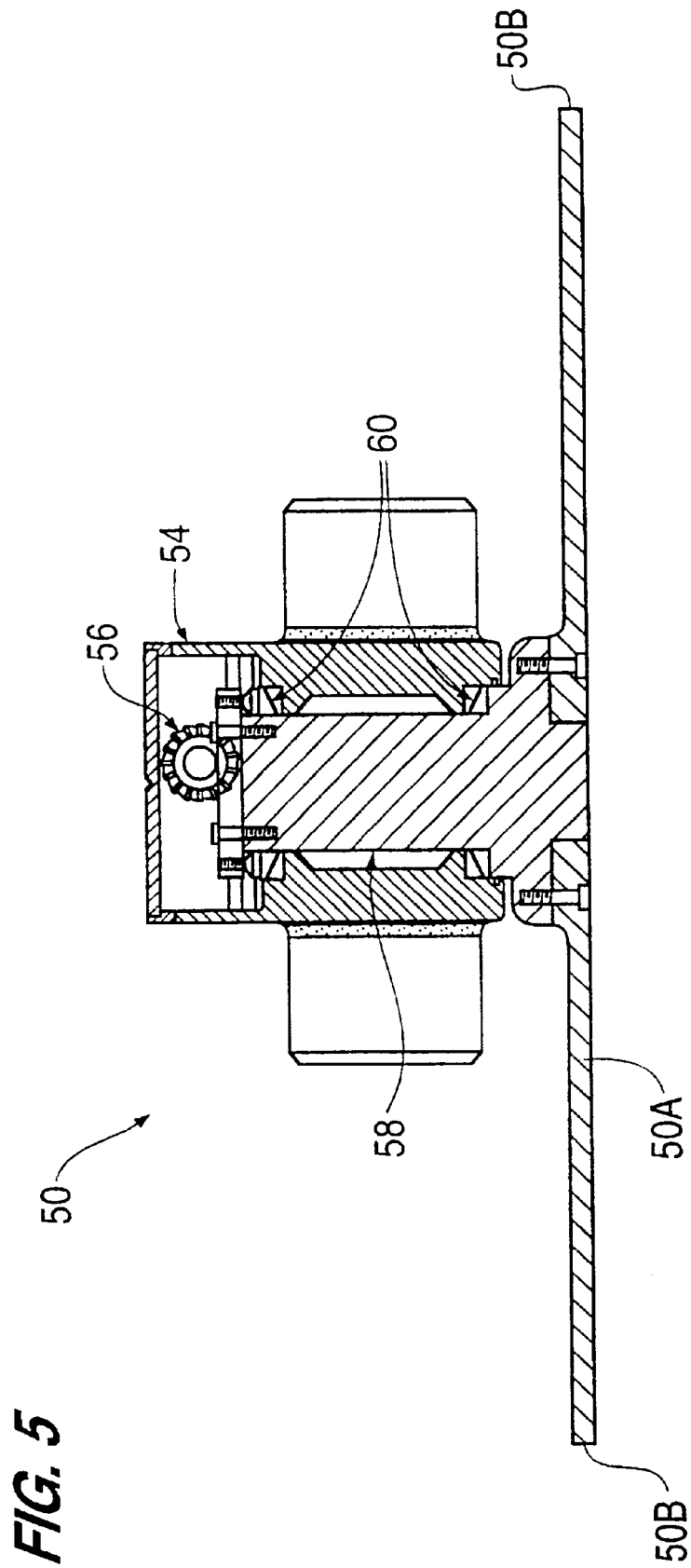
FIG. 5 is an enlarged front view of the rotating saw of FIG. 1.
Figure 6A:
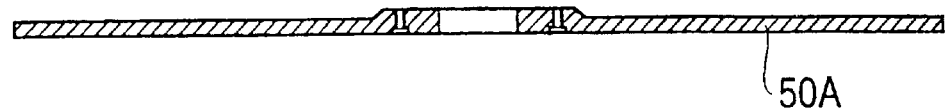
FIG. 6A is an enlarged front view of the saw blade of FIG. 5.
Figure 6B:
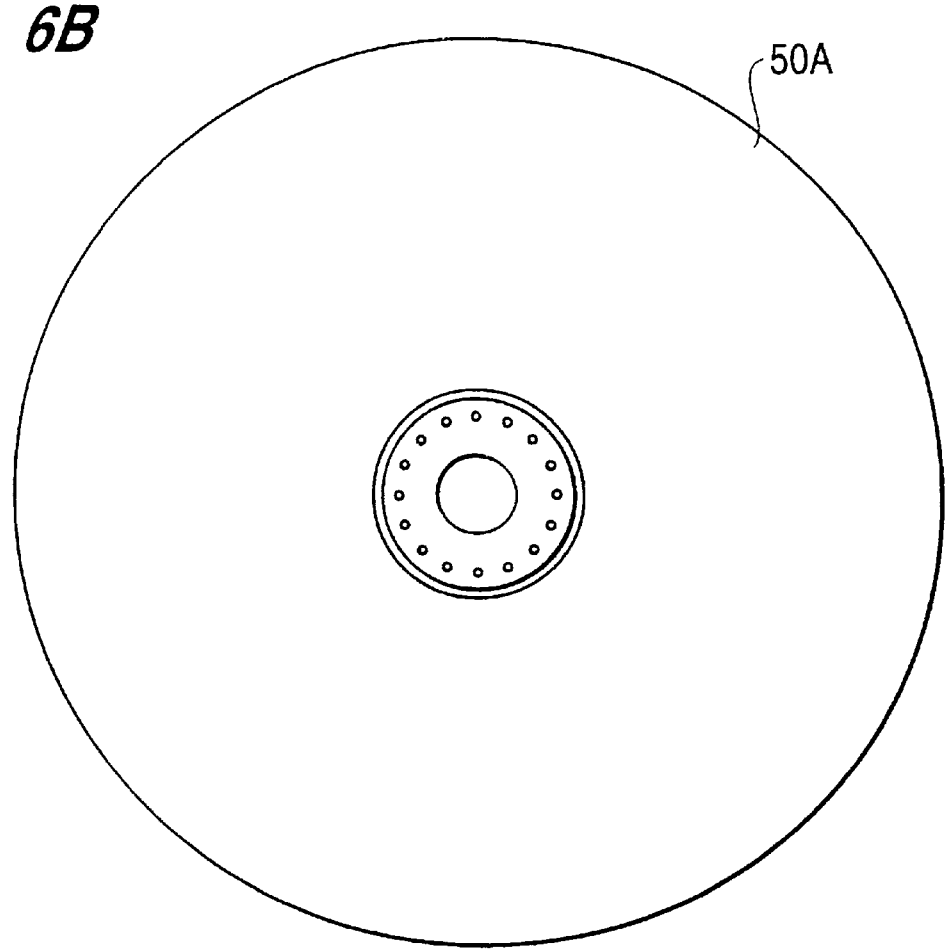
FIG. 6B is an enlarged top view of the saw blade of FIG. 6A.

A plurality of moving wheeled accumulator cars 70, each having extendable/retractable paddles 72 or arms and spaced equal distance from each other, travel around each rail 64A, 64A', 64B, 64B' such that each car 70 travels along one of the rails 64A, 64A', 64B, 64B' from the cutting area 30 to the rear of the accumulation area 32 and then returns to the cutting area 30. The cars 70 on each of the rails 64A, 64A', 64B, 64B' are driven by continuous loop chains 74 attached to the cars 70, rotating in a horizontal plane. As best shown in FIG. 3, the chains are driven and supported by vertical shafts 76 with sprockets 78 that are operably secured to the harvester frame 20. Shafts 76 are attached to hydraulic drive motors (not shown). As best shown in FIGS. 7, 8, 9A, and 11, accumulator cars 70 include steel car bodies 80, preferably 18 inches long on one model, pivoting steel paddles 72 for pushing trees and hydraulic paddle position control cylinders 82 with pistons 85. The cars 70 are preferably mounted with their axles 84 in a generally vertical plane and circulate in the closed loop rail circuits 64 that are attached to the frame 20. Preferably, each car has steel wheels 86.

Figure 7:
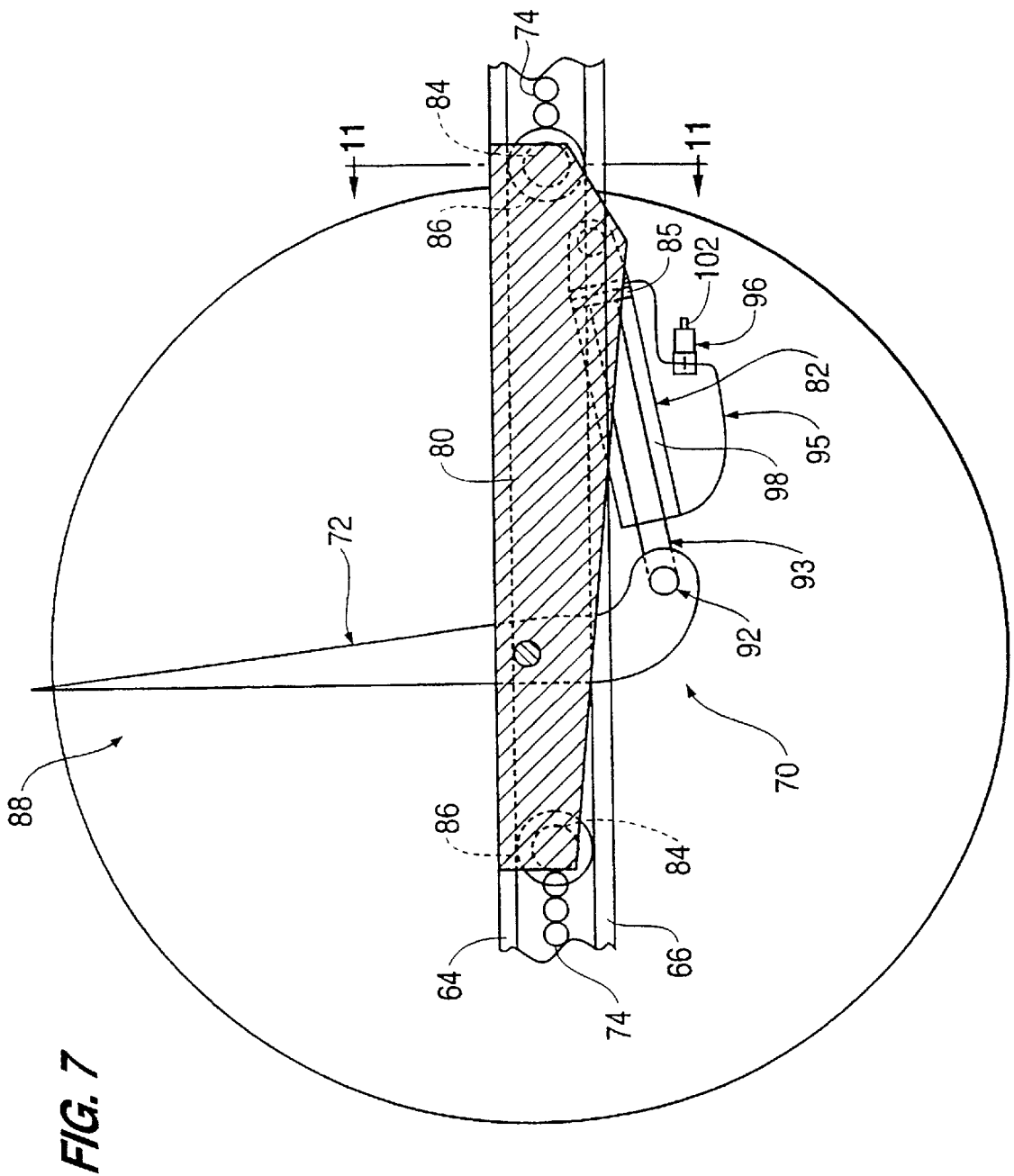
FIG. 7 is an enlarged side view of the accumulation arm assembly installed on the embodiment of FIG. 1.
Figure 8:
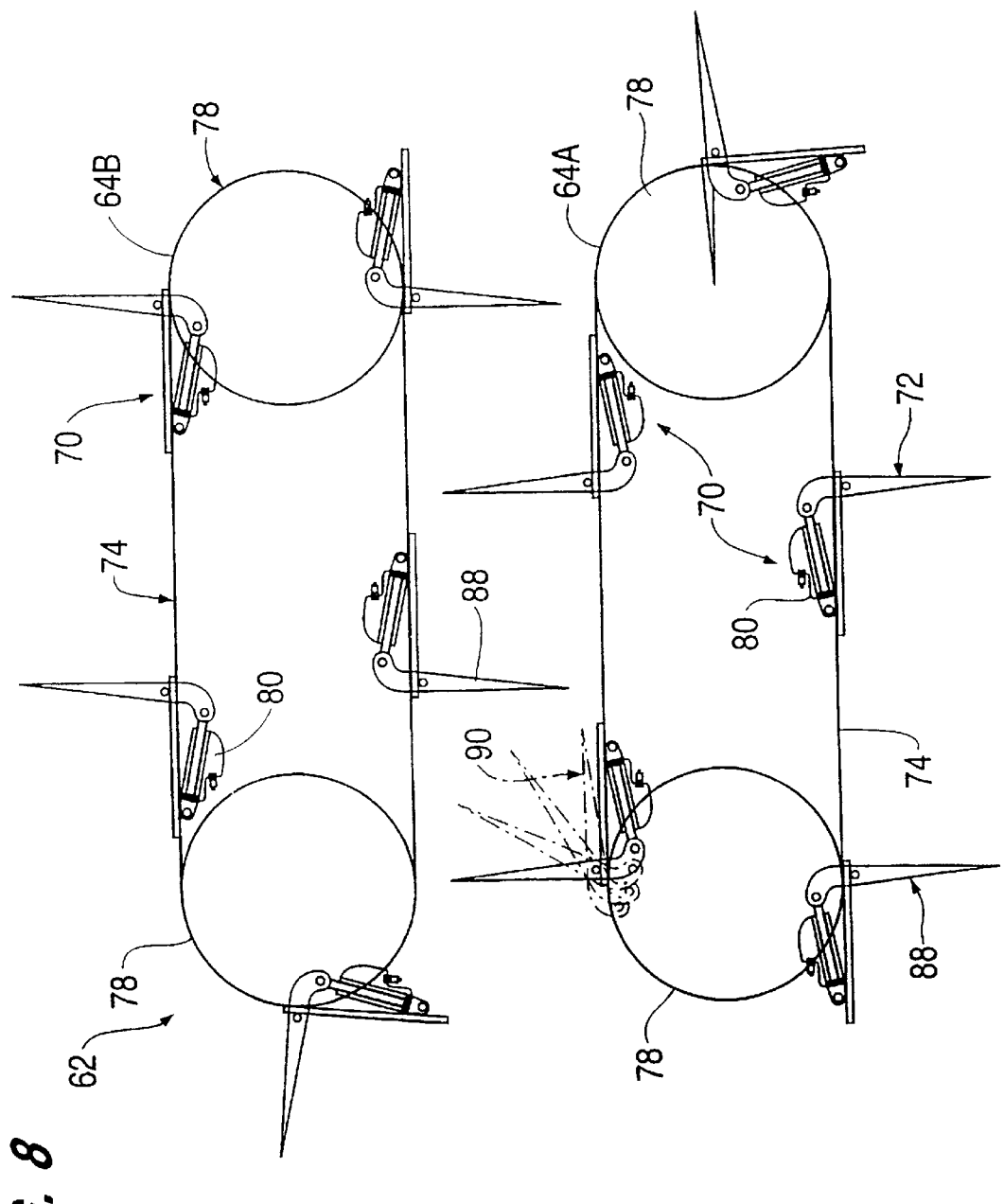
FIG. 8 is a schematic top view of the accumulation arm circuit of an alternative preferred embodiment of the present invention.
Figure 9:
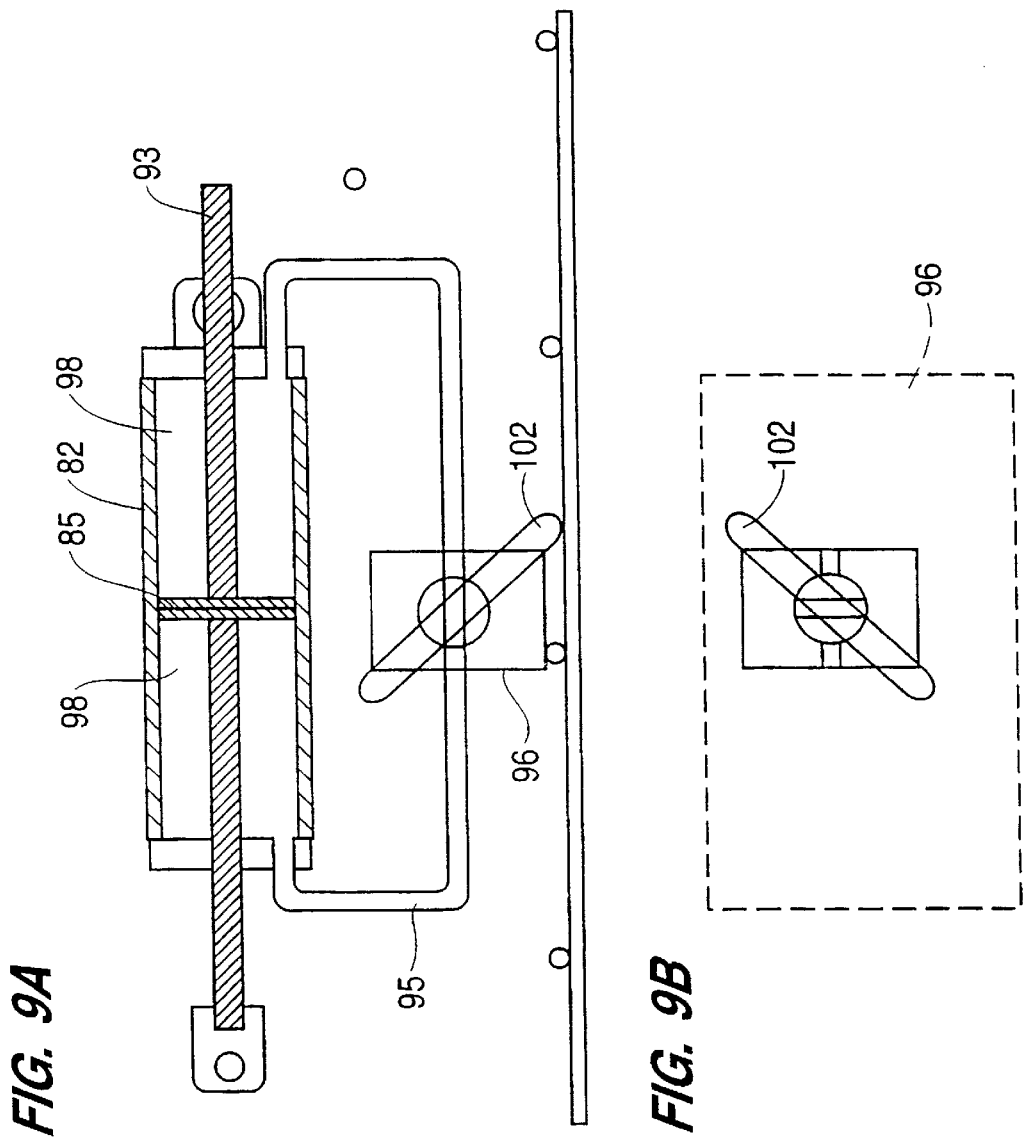
FIG. 9A is a schematic view of a preferred hydraulic system for use on the accumulation arm of FIG. 7.
FIG. 9B is an exploded schematic view of an alternative valve position of the preferred hydraulic system of FIG. 9A.

As shown in FIG. 1, each paddle 72 is sized and shaped to extend from one side of the frame (here the left side 36) to the opposite side of the frame (here the right side 38) so that it extends across the accumulation area width 40 when in its extended position. Preferably, each paddle 72 is biased to its extended position 88 (FIGS. 1 and 7), preferably with a spring (not shown). When each paddle 72 is not needed to push a tree 63 from the cutting area 30 to the accumulation area 32, it is in the "relaxed mode," which means any trees encountered will push the paddle 72 into a retracted position 90. When a paddle 72 is needed to push a tree 63, it is locked in the extended position 88 (FIG. 1). Paddle 72 position is controlled by the position of the piston 85 in the hydraulic cylinder 82 on each car 70. As best shown in FIG. 7, the piston 85 is pivotally secured to the paddle 72, preferably with a pin 92.

Referring now to FIGS. 7, 9A and 9B, each car's hydraulic piston 85 is controlled by a unique Closed Loop Hydraulic Cylinder Control System. This system includes the hydraulic cylinder 82, the dual acting hydraulic piston 85 with shaft 93 in the cylinder, a hydraulic line 95 connecting the two chambers 98 of the hydraulic cylinder 82, and a control valve 96 in the hydraulic line 95. Depending upon the position of the control valve (open or closed), hydraulic fluid movement between the chambers 98 on either side of the hydraulic piston 85 is controlled thus controlling the hydraulic piston's movement. With a closed valve 96 between the two chambers 98, hydraulic fluid pressure holds the hydraulic piston 85 in a given position. With an open valve 96 between the two chambers 98, the piston 85 is allowed to move freely by displacing hydraulic fluid which moves freely between the chambers 98.

The pivoting accumulator car paddle 72 is connected by the pin 92 to the hydraulic piston 85 and shaft 93; thus paddle position is controlled. This Closed Loop Hydraulic Control System has additional widespread potential applications beyond the Paddle Control System used in the harvester.

Figure 10:
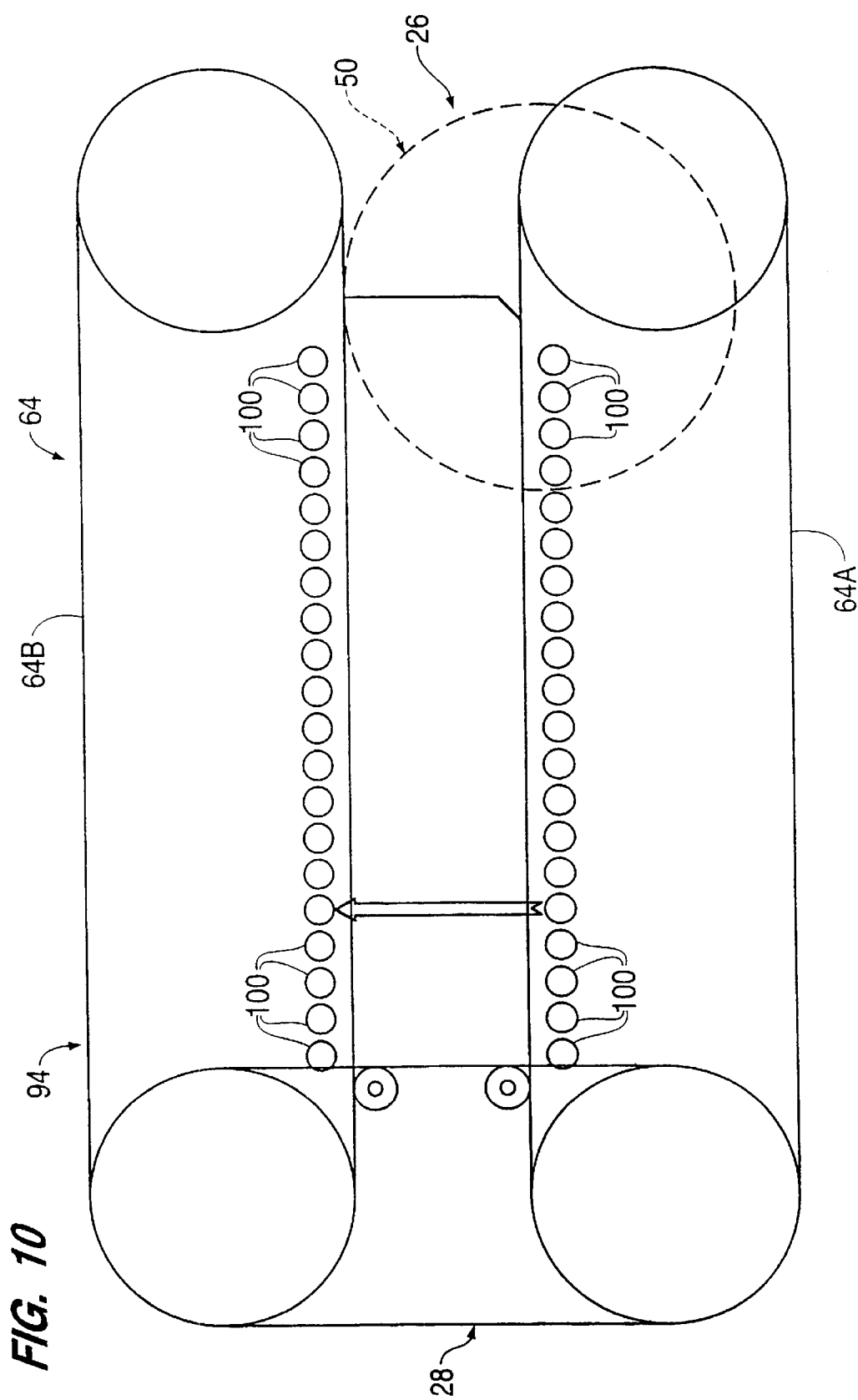
FIG. 10 is a top schematic view of a preferred control detection system for use on the embodiment of FIG. 1.

As part of the Paddle Control System in the harvester 10, the accumulator cars' hydraulic piston control valves 96 receive information from an intelligent control system. The intelligent control system uses a programmable controller or computer capable of generating outputs to the paddles depending upon need. Depending on model and as best shown in FIG. 10, this system uses approximately 150 infrared tree position sensors 100, on several levels, in the accumulator to determine the degree to which the accumulation area 32 or is loaded, the position of trees and the degrees of tilt of the trees from the vertical. The information from the tree position sensors 100 is processed by the programmable control or computer and transferred to a system of output solenoids which are able to activate the hydraulic control valve 96 on each passing accumulator car 70, with a lever 102. The position of this control valve 96 controls the position and locking of the paddles 72 as needed to push the trees.

Power is preferably supplied to the harvester with 1 or 2 internal combustion or diesel engines 48. The engines power 1) the cutting apparatus 14 either by direct drive or hydraulic motors; 2) the accumulator car chain drive sprocket 78 hydraulic motors; and 3) the hydraulic steering mechanism.

In one preferred embodiment, power can be supplied by two 400 horsepower, 750 cubic inch 6 cylinder diesel engines 48. The engines 48 are mounted to the harvester frame 20. Power take off is through a standard transmission with acceptable gear ratios (not shown). A transfer case (not shown) is attached to the output of the transmission driving a hydraulic pump to assist in powering the above listed hydraulic devices. A horizontal drive shaft can be connected at one power take off to provide direct drive power for the saw, as described in a prior section. A dedicated pump is driven by one engine to provide power for the drive tracks and accumulator cars. Accessory systems are provided as needed for engine and harvester operation including: fuel system, electrical system, engine controls, and the like.

Use And Operation

Figure 12A:
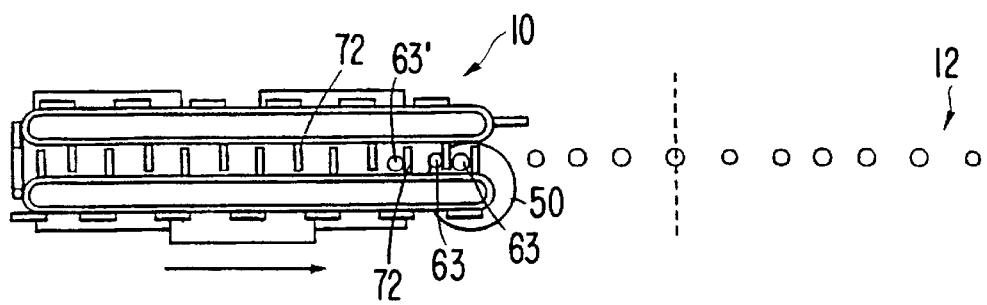
FIGS. 12A–12D are a sequential top view of the embodiment of FIG. 1, showing a possible harvesting method.
Figure 12B:
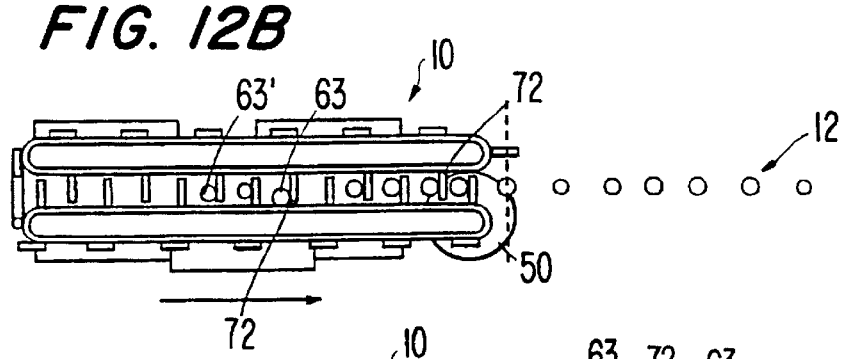

Having fully described the harvester 10, its use and operation will be described. As best shown in FIGS. 12A–12D, an operator positions the harvester 10 along a row of trees 12 to be cut and secures the back support member 44 in a closed position as shown. Preferably, the harvester travels along the row of trees 12 at the same speed forward as the accumulator cars 70 travel along their respective rails 64A, 64A', 64B, 64B'. More preferable, the harvester 10 is propelled forward at up to 6 miles per hour. As shown in FIG. 12A, as the harvester 10 approaches a first tree, it cuts it with saw while an upper and lower accumulator paddles 72 capture the cut tree in its vertical orientation and begin to propel it from the cutting area 30 of the frame 20 to the accumulation area 32, while the bottom of the tree skids along the skid plate 42.

As the harvester 10 advances forward, it continues to cut additional trees in a like manner while already cut trees 63 simultaneously advance toward the rear of the accumulation area 32. As the first tree cut 63' reaches the back of the accumulation area 32 adjacent to the back support member, the hydraulic control valves 96 for the accumulator paddles 72 propelling that tree 63' are commanded open. As a result, the paddles 72 assume their retracted position 90, allowing their respective cars 70 to continue on their respective rail circuits 64A, 64A', 64B, 64B'. This allows the paddles 70 to relax and retract so as not to interfere with accumulated trees. The trees 63 remain supported by the next accumulator paddles in the circuit. As those accumulator paddles reach the tree, they too are retracted, and so on as the harvester 10 travels down the row of trees 12.

Figure 12C:
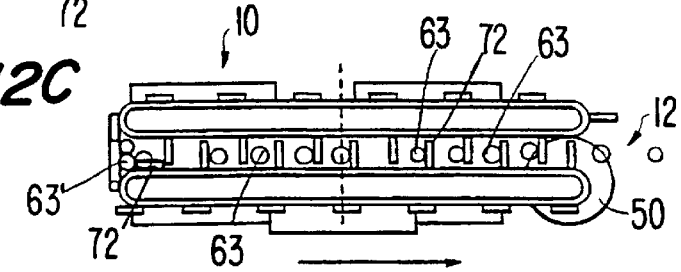
Figure 12D:
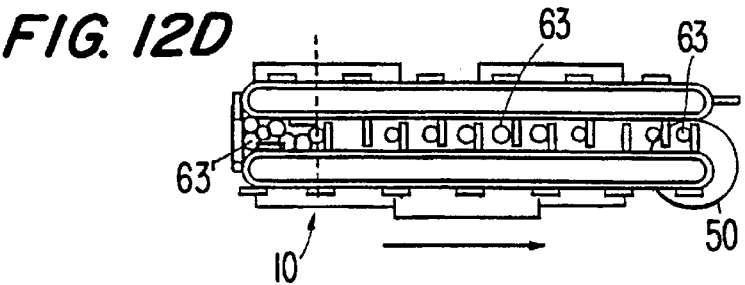

As a second cut tree approaches first cut tree, the hydraulic control valves 96 for the accumulator paddles 72 propelling the second tree are commanded open, accumulating both trees in the accumulation area 32 at the back end 28 of the frame 20. As shown in FIGS. 12C and 12D, as the moving cars 70 reach the filled portion of the accumulator, the computer interprets the input from the tree position sensors 100 and signals the output solenoids in the appropriate positions to activate the hydraulic control valve 96 on the passing cars. Such operation can continue for each additional cut tree, until the accumulation area 32 is completely filled.

This mechanism continuously pushes the trees that have been cut by the cutting apparatus 14 back into the accumulation area 32 as the harvester 10 is propelled forward along the row of trees 12. One size of harvester head is 40 feet long×13 feet wide and 11 feet high. This size of harvester accumulator can accommodate up to 30 tons of trees in a 38 foot long by 30 inches wide section. Other models are anticipated to have accumulator capacities from 0.5 tons to 50+ tons.

Cut trees 63 may be unloaded from the accumulation area 32 of the harvester 10 using two different methods. First, the operator opens the back support member 44 to allow the accumulated trees to pass through the back end 28 of the frame 10. The accumulator paddles 72 closest to the cutting area 30 are then commanded and locked into their extended position 88, while their respective cars 70 travel along their respective circuits 64A, 64A', 64B, 64B'. The entire batch of accumulated trees may be unloaded as the cars 70 travel rearward. A truck or storage container (not shown) follows the harvester 10 to collect the batch of harvested trees.

Preferably, and as best shown in FIGS. 1 and 2, the harvester is upwardly sloping from front to back to raise the cut trees as they travel through the harvester 10. Accordingly, the height 104 of the accumulated trees above the ground may be adjusted to the height of the truck or storage container receiving the unloaded accumulated trees. Accordingly, the need for an additional lifting device, such as a crane, is eliminated.

Alternatively, a truck trailer (not shown) can be towed behind the harvester with the back support member in its open position. Accordingly, each cut tree will fall into the truck trailer, one at a time, as it reaches the back of the accumulation area 10. Under either method, the accumulation area 10 may be unloaded without interfering with continuous cutting and accumulation of additional trees.

SECOND PREFERRED EMBODIMENT

Figure 13:
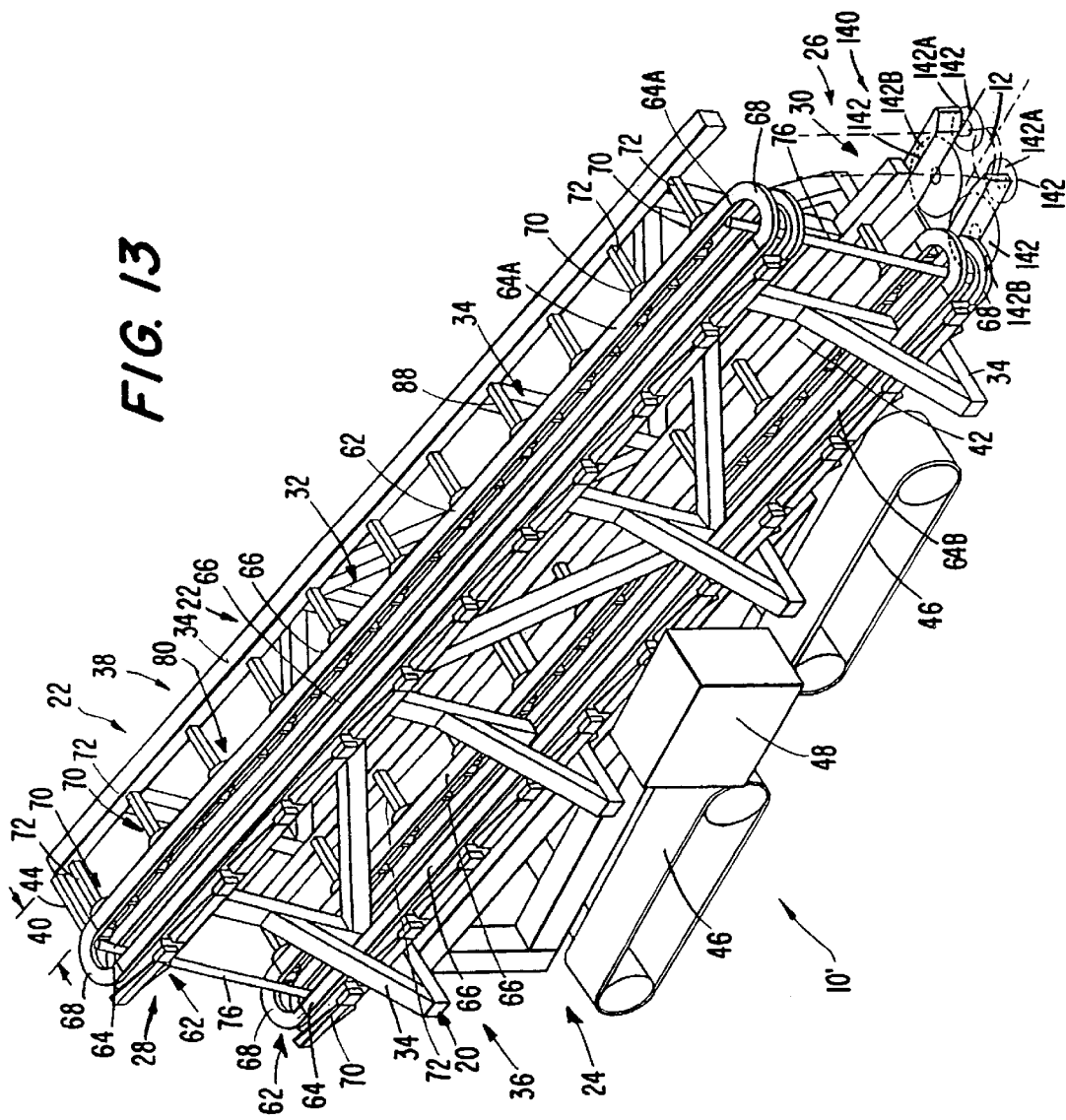
FIG. 13 is an isometric view of a tree harvester of the present invention having a curfless cutter in accordance with a second preferred embodiment of the present invention.
Figure 14:
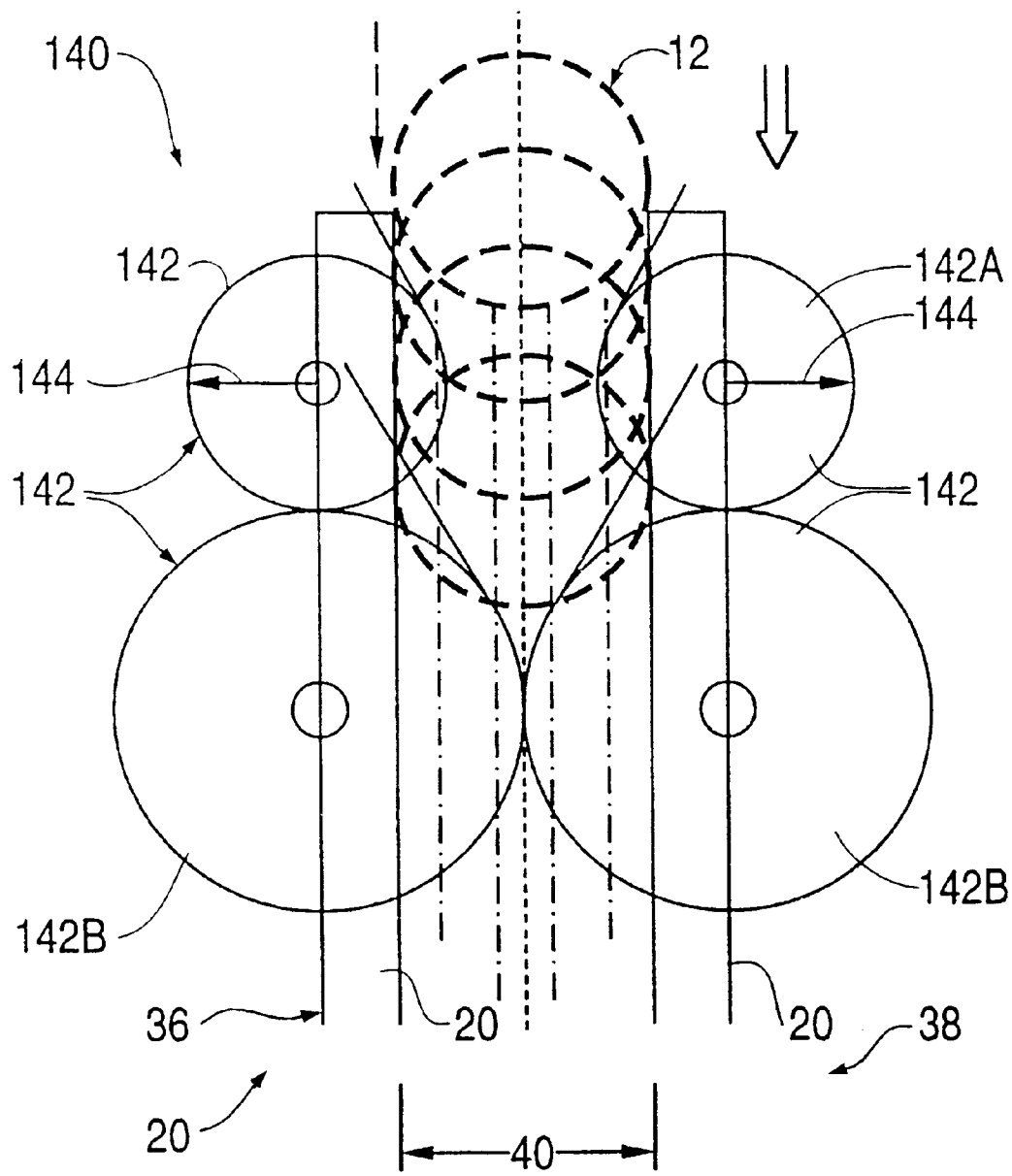
FIG. 14 is a top schematic view of the curfless cutter of FIG. 13 showing a possible use of the cutter to cut a tree.

As best shown in FIGS. 13 and 14, a harvester 10' in accordance with a second preferred embodiment is disclosed having all the basic features of the first preferred embodiment, except it includes a curfless cutting apparatus 140. It operates and is used in the same manner as the first preferred embodiment.

The curfless cutting apparatus 140 includes two or more sharpened rotating disk blades 142 that sever a tree by shearing it as it travels through the rotating disk blades 142 in a manner similar to a double wheel pipe cutter. These disk blades 142 rotate slowly, and are powered by direct drive or by the harvesters forward motion driving the trees 12 through the blades 142. Preferably, and as best shown in FIG. 14, the cutting apparatus 140 includes a front and rear pair of cutting blades 142A, 142B, respectively, secured to the cutting area 30 of the frame 20. The front pair 142A of cutting blades 142 are extremely sharp and have a diameter 144 smaller than the rear pair 142B of cutting blades 142 such that as the harvester 10' approaches a tree to be cut, the first pair 142A of blades slice through a portion of the tree. As the harvester travels along its path, the rear blades 142B enter the previously cut portions of the tree and complete the cut as shown. The curfless cutting apparatus 140 does not produce sawdust or chips.

THIRD PREFERRED EMBODIMENT

As best shown in FIGS. 15A–19E, a third preferred embodiment is disclosed. The harvester 10" of this embodiment includes the basic features of the first and second embodiments, but it is attached to a propelled vehicle 16, rather than being self-propelled.

Figure 15A:
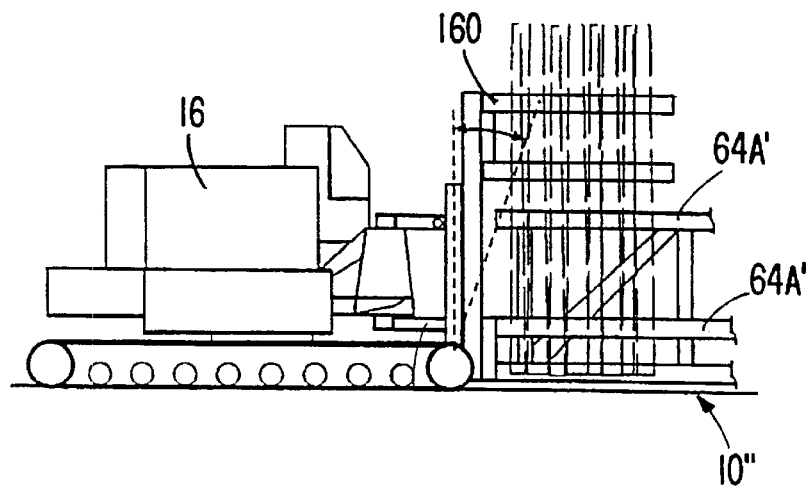
FIG. 15A is a side view of a tree harvester of the present invention attached to a vehicle in accordance with a third preferred embodiment of the present invention.

As best shown in FIGS. 15A, the harvester 10" includes a frame 20 having the same features of the first preferred embodiment, with like elements having the same element numbers. The frame 10 is supported on left and right tracks (150, 152, FIG. 15B) and has a vehicle mounting portion 154 at its back end 28. The harvester 10" is operably secured to the vehicle 16 such that the vehicle 16 pushes or pulls the harvester 10" along the row of trees 12 to be cut.

Figure 15B:
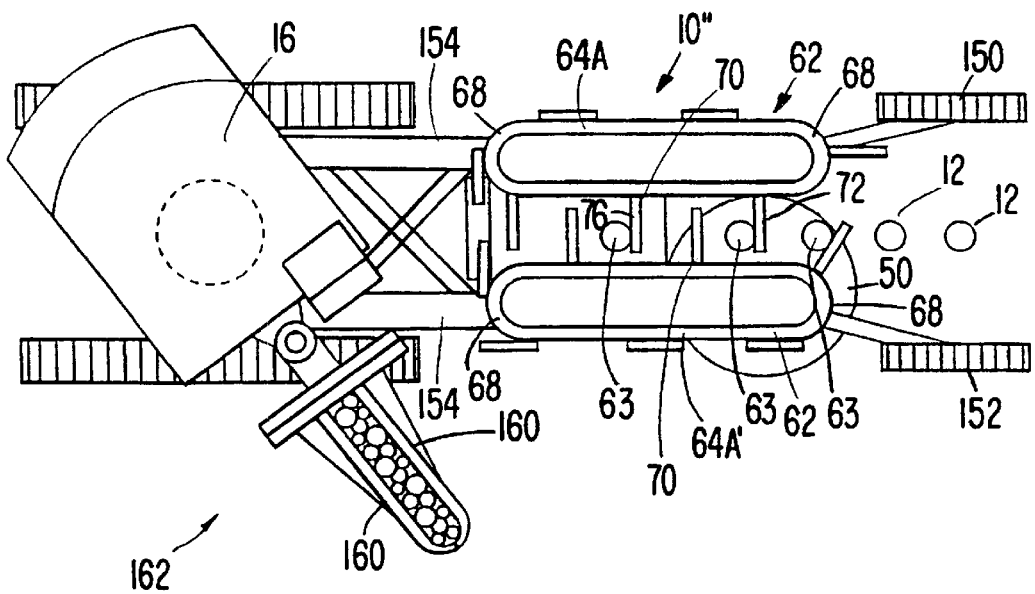
FIG. 15B is a top view of the tree harvester of FIG. 15A showing a possible means to unload the harvester.
Figure 16:
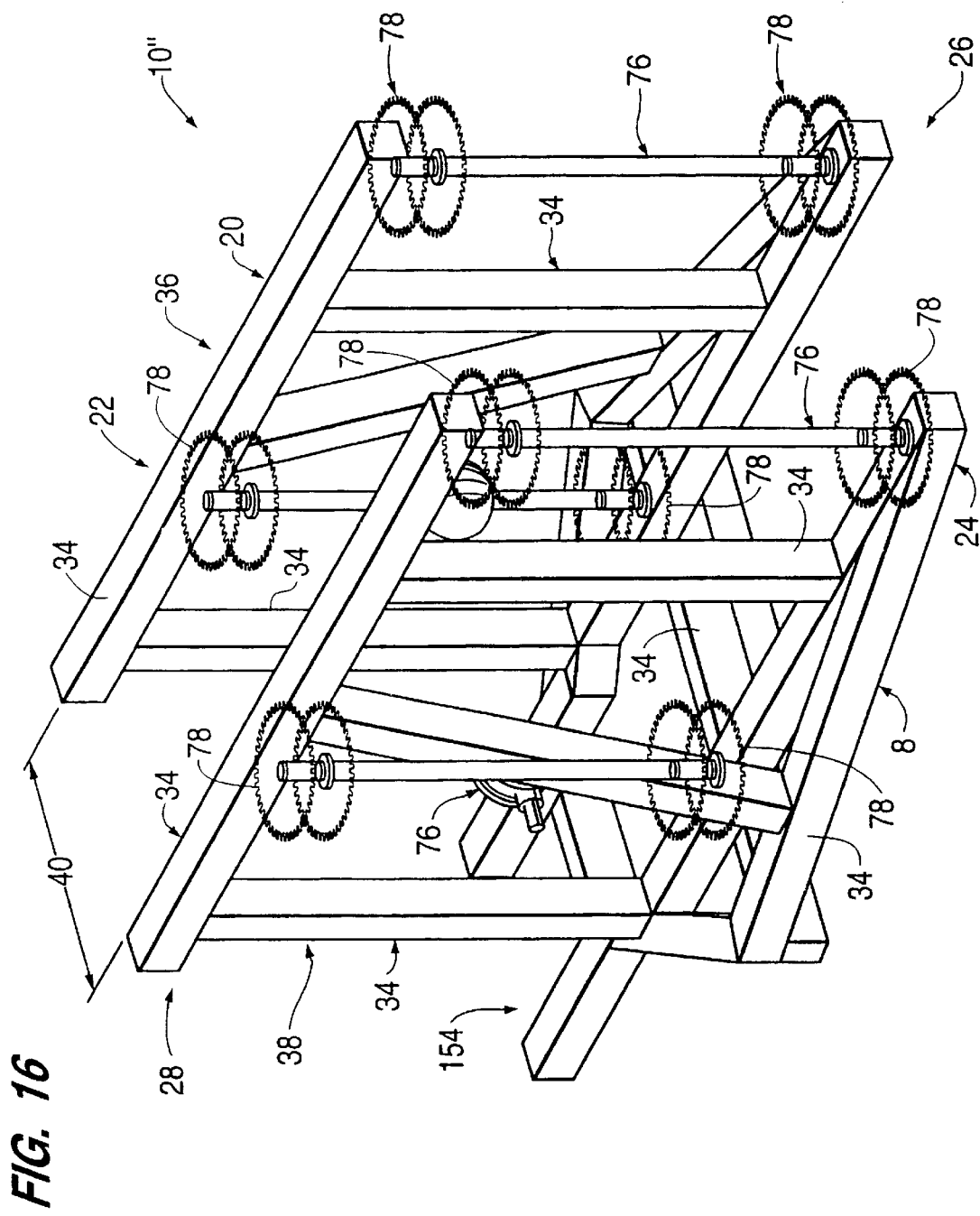
FIG. 16 is an enlarged isometric view of the frame and accumulation arm drive system of FIG. 13.
Figure 17:
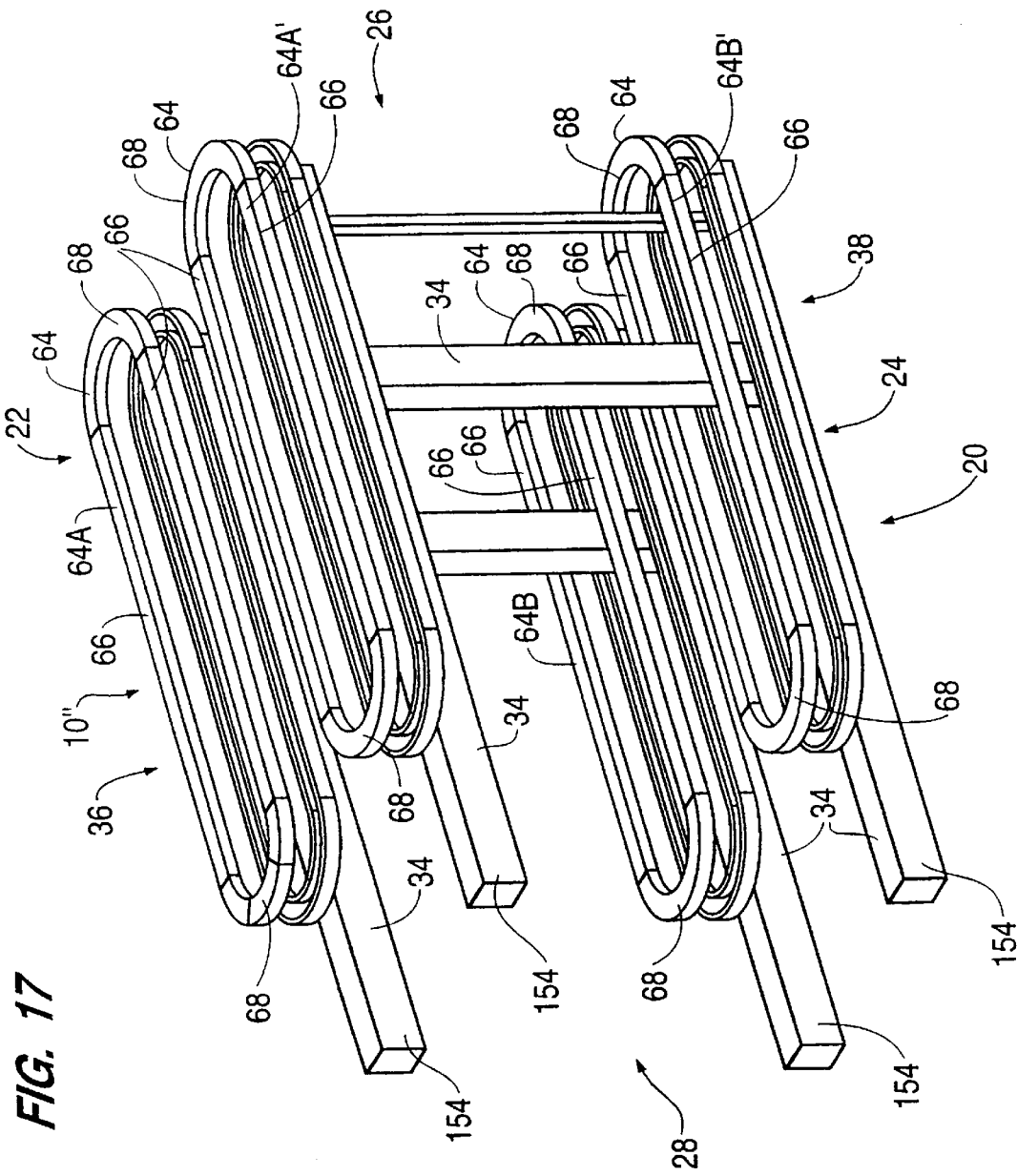
FIG. 17 is an enlarged isometric view of the frame and accumulation rails of the harvester of FIG. 13.
Figure 18:
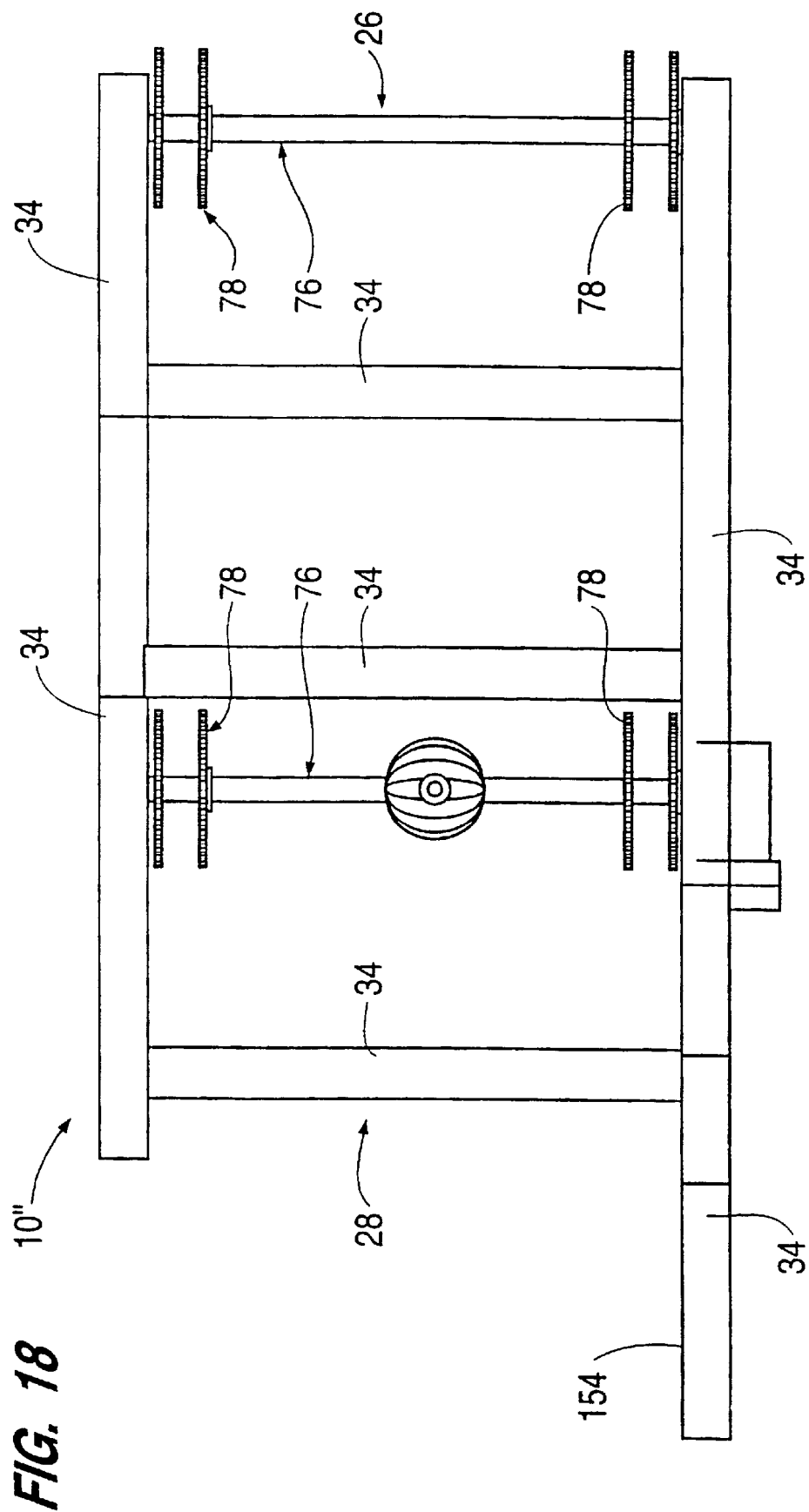
FIG. 18 is a side view of the frame and accumulation arm drive system of FIG. 16.
Figure 19A:
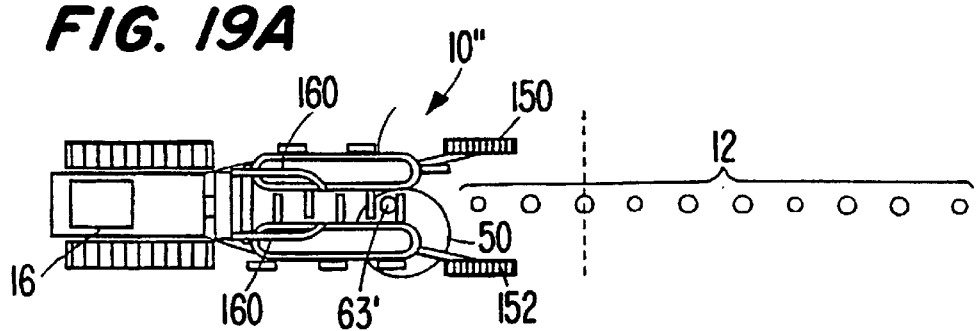
FIGS. 19A–E are a sequential top view of the embodiment of FIG. 13, showing a possible harvesting method.
Figure 19B:
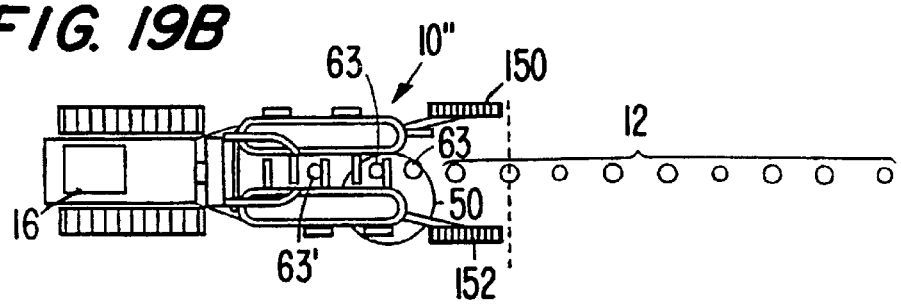
Figure 19C:
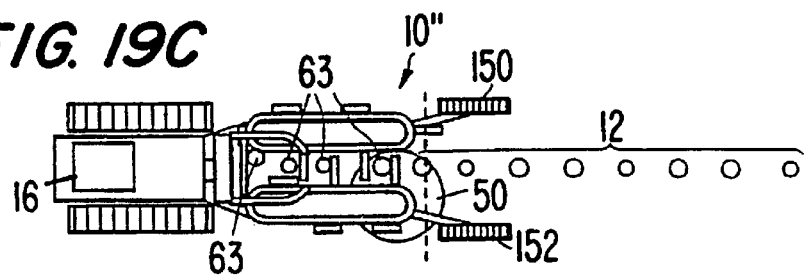
Figure 19D:
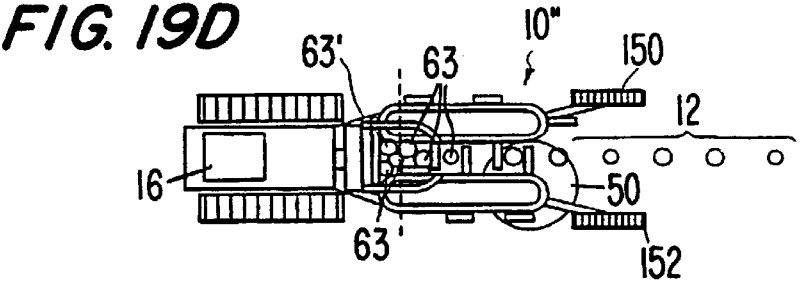
Figure 19E:
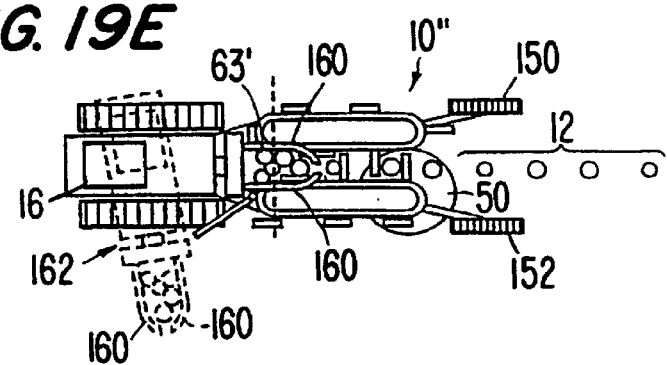

The harvester's 10" use and operation are similar to the harvester's 10, 10' of the first and second embodiments. As best shown in FIGS. 19A–19E, the harvester 10" is propelled by the vehicle 16 along the row of trees 12 to be cut. As each tree is cut, it is supported and propelled to the back end 28 of the frame 20 by the accumulation paddles 72. With this embodiment, it is desirable to unload the collection of accumulated trees with gripping arms 160 pivotally secured to the vehicle 16. As shown in FIGS. 15A and 15B, the gripping arms 160 grip the collection of accumulated trees, lifts them from the accumulation area 32 of the harvester 10", and rotates to one side (here the right side 163) for depositing in a collection receptacle or the like. The removal of accumulated trees can be done without interfering with the continuous cutting and accumulation of additional trees.

In view of the wide variety of embodiments to which the principles of the invention can be applied, it should be apparent that the detailed embodiments are illustrative only and should not be taken as limiting the scope of the invention. Rather, the claimed invention includes all such modifications as may come within the scope of the following claims and equivalents thereto.

What is claimed is:

1. A tree harvester for continuously cutting and accumulating trees including:
   an elongated frame having a cutting area and an elongate accumulation area;
   tree severing means operably secured to the cutting area of said frame;
   an elongate continuous rail secured to the frame and extending from said cutting area to a rear portion of said accumulation area;
   a plurality of tree accumulating arms pivotally secured to accumulation cars operable secured to said rail, each arm able to move along the continuous rail from said cutting area to said rear portion of said accumulation area such a tree cut by the severing means is propelled to the rear most portion of said frame.

2. The tree harvester of claim 1, wherein said arms have an extended position and a retracted position, and said arms propel the cut tree in the extended position and pass by the cut tree in a retracted position.

3. The tree harvester of claim 2, wherein said arms are hydraulically actuated through a hydraulic system, said hydraulic system including a hydraulic cylinder, a piston defining two hydraulic chambers and a hydraulic line extending between the two hydraulic chambers;
   a control valve having open and closed positions operably secured within said hydraulic line such that in its open position hydraulic fluid passes freely through said hydraulic line between said chambers thereby allowing the piston to move freely within the said cylinder and in its closed position hydraulic fluid is precluded from moving between chambers thereby holding said piston in place.

4. The tree harvester of claim 3, wherein said arms are biased to their retracted position.

5. The tree harvester of claim 4, further including sensors for detecting the volume of accumulated trees in the accumulation area, and a control system for actuating the control valve on each arm in response to the detected volume of accumulated trees in the accumulation area.

6. The tree harvester of claim 1, wherein said tree severing means is a circular saw.

7. The tree harvester of claim 1, wherein said tree severing means is a curfless cutting system having a plurality of sharp rotatable disk blades.

8. The tree harvester of claim 1, further including means for propelling the frame along the row of trees.

9. The tree harvester of claim 8, wherein said means for propelling includes a propulsion system attached to the frame.

10. The tree harvester of claim 8, wherein said means for propelling includes attaching the harvester to a self-propelled vehicle.

11. A method for simultaneously cutting and accumulating trees in a row of trees using a harvester having an elongate frame with a cutting device at a front cutting area and an elongate accumulation area comprising:

positioning the cutting area of the harvester at a first tree in the row of trees;

advancing the harvester along the row of trees;

severing the first tree in cutting area of the harvester while the harvester continuously advances along the row of trees to a second tree in the row of trees;

supporting the first tree in its upright position while propelling it to the accumulation area and advancing the harvester along the row of trees to a second tree in the row of trees;

severing the second tree in the cutting area of the harvester while supporting the first tree in its upright position within the accumulation area and advancing the harvester along the row of trees to a third tree in the row of trees;

supporting the second tree in its upright position while propelling it to the accumulation area, supporting the first tree in its upright position in the accumulation area, and advancing the harvester along the row of trees to a third tree such that trees are simultaneously cut and accumulated without slowing down or stopping the harvester as it advances along the row of trees.

12. The method for simultaneously cutting and accumulating trees of claim 11, further including simultaneously removing accumulated trees from the accumulation area while the harvester advances along the line of trees.

13. The method of simultaneously cutting and accumulating trees of claim 12, wherein said severing involves using a curfless cutter.

14. The method of simultaneously cutting and accumulating trees of claim 13, wherein said propelling involves using a retractable arm secured to a rail extending from the cutting area to the accumulation area.

* * * * *